United States Patent [19]

Ishihara et al.

[11] Patent Number: 5,188,910
[45] Date of Patent: Feb. 23, 1993

[54] SOLID OXIDE FUEL CELLS

[75] Inventors: Takeshi Ishihara; Hidenobu Misawa, both of Toyoake, Japan

[73] Assignee: NGK Insulators, Ltd., Japan

[21] Appl. No.: 671,078

[22] Filed: Mar. 18, 1991

[30] Foreign Application Priority Data

Mar. 26, 1990 [JP] Japan .................................. 2-73194

[51] Int. Cl.[5] .................................. H01M 8/10
[52] U.S. Cl. .................................. 429/31; 429/30; 429/32
[58] Field of Search .................................. 429/30, 31, 32

[56] References Cited

U.S. PATENT DOCUMENTS

| | | | |
|---|---|---|---|
| 4,791,035 | 12/1988 | Reichner | 429/31 |
| 4,827,606 | 5/1989 | Szreders et al. | 429/31 |
| 4,833,045 | 5/1989 | Pollack et al. | 429/32 |
| 4,894,297 | 1/1990 | Singh et al. | 429/31 |
| 4,943,494 | 6/1990 | Riley | 429/30 |

FOREIGN PATENT DOCUMENTS 0285727 10/1988 European Pat. Off. .
0286360 10/1988 European Pat. Off. .
0320087  6/1989 European Pat. Off. .

Primary Examiner—Mark L. Bell
Assistant Examiner—Willie J. Thompson
Attorney, Agent, or Firm—Parkhurst, Wendel & Rossi

[57] ABSTRACT

A solid oxide fuel cell has a plurality of cylindrical solid oxide fuel cell elements arranged. Each of the fuel cell elements at least has a fuel electrode, a solid electrolyte and an air electrode. A multi-contact point type current-collecting member is contacted to the fuel electrodes. The fuel electrode of a certain fuel cell element is electrically connected to the air electrode of a solid oxide fuel electrode adjacent to this certain fuel cell element through the multi-contact point type current-collecting member and an interconnector. The multi-contact point type current-collecting member is contacted with the substantially entire surface of the fuel electrodes.

5 Claims, 2 Drawing Sheets

FIG_1
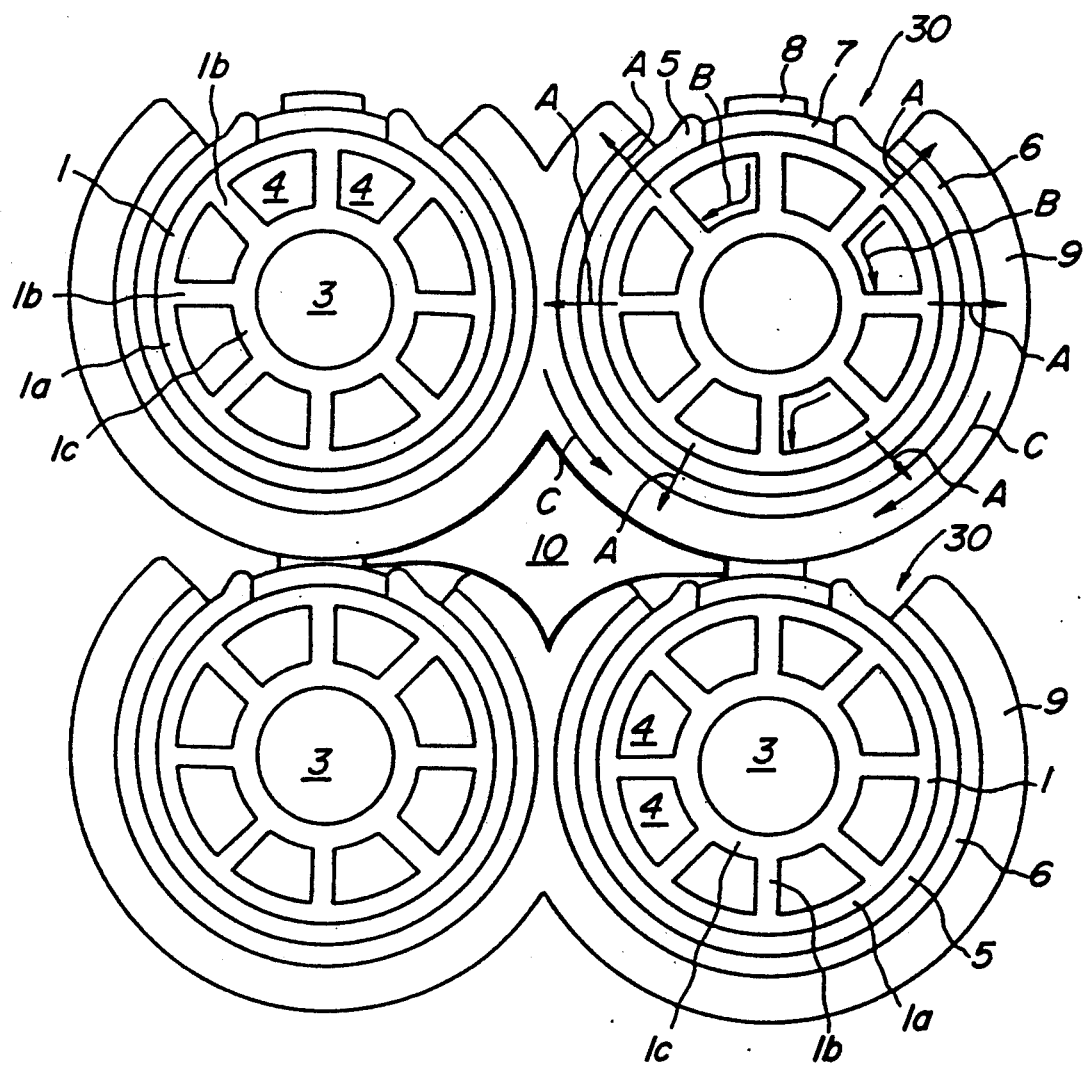

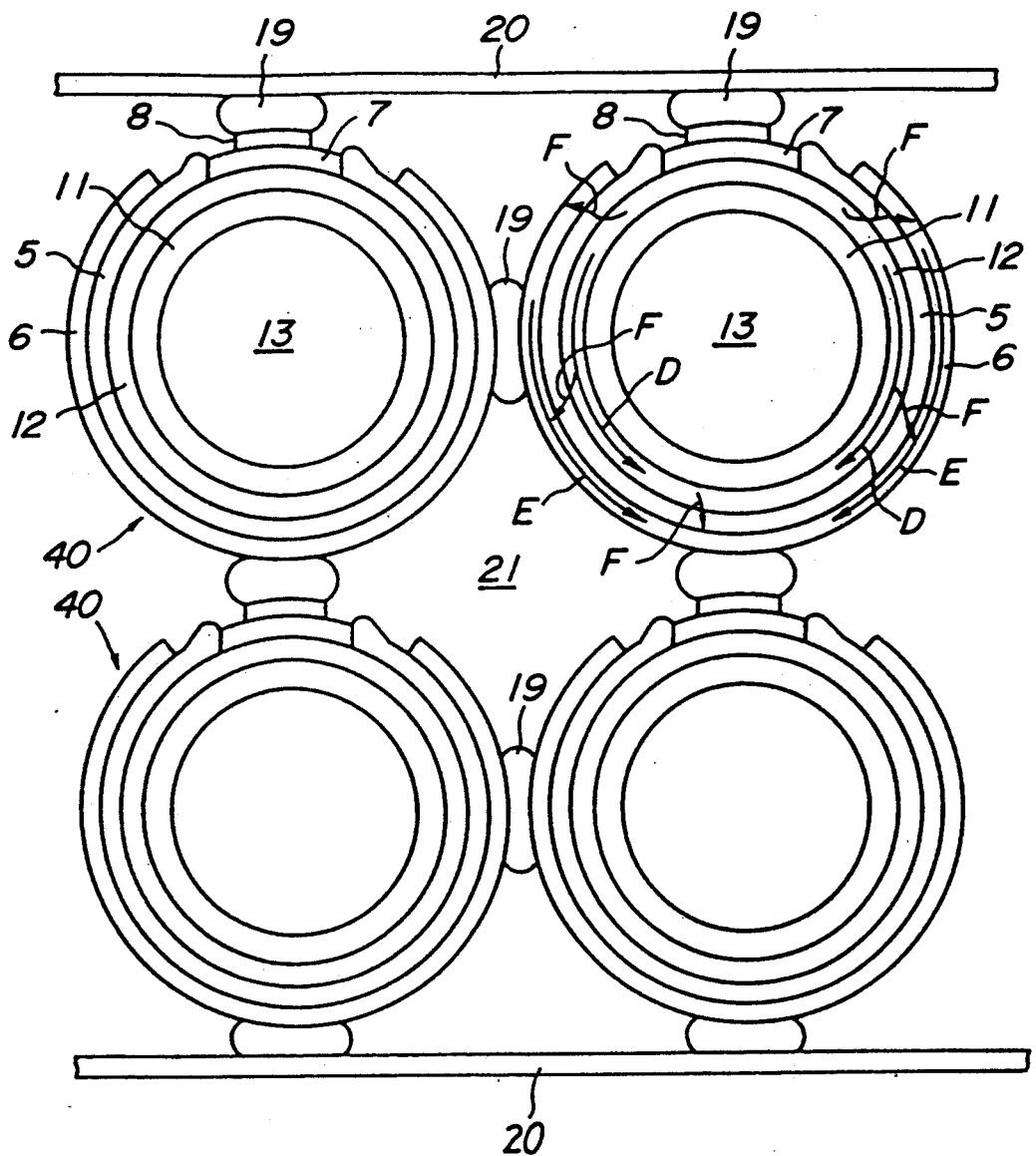

SOLID OXIDE FUEL CELLS

BACKGROUND OF THE INVENTION

Field of the Invention

The present invention relates to solid oxide type fuel cells.

Related Art Statement

Recently, fuel cells have been noted as useful as power generating equipments. Such a fuel cell is a device capable of directly converting chemical energy possessed by fuel to electrical energy. Since the fuel cell is free from limitation of Carnot's cycle, the cell is an extremely promising technique in that the fuel cell essentially has a high energy conversion efficiency, a variety of fuels (naphtha, natural gas, methanol, coal reformed gas, heavy oil, etc.) may be used, and the cell provokes less public nuisance. Moreover, the power generating efficiency of the fuel cell is not influenced by the scale of the equipment. Particularly, since the solid oxide fuel cell (hereinafter referred to as "SOFC") operates at high temperatures of 1,000° C. or more, activity of electrodes is extremely high. Thus, use of catalyst of a noble metal such as expensive platinum is unnecessary. In addition, since the SOFC has low polarization and relatively high output voltage, its energy conversion efficiency is conspicuously higher than that in the other fuel cells. Furthermore, since the constituent materials are all solid, the SOFC is stable and has long use life.

FIG. 2 is a front view illustrating a part of a fuel cell in which such cylindrical SOFC elements are arranged.

In FIG. 2, an air electrode 12 is provided on the outer periphery of a cylindrical ceramic support body 11, and a solid electrolyte 5 and a fuel electrode 6 are arranged along the outer periphery of the air electrode 12. Further, an interconnector 7 is provided on the air electrode 12 in an upper zone as viewed in FIG. 2, and a connection terminal 8 is attached onto the interconnector 7. Thereby, the cylindrical SOFC element 40 is constituted. In FIG. 2, the air electrode 12 is connected to the fuel electrode between the upper and lower adjacent cylindrical SOFC elements 40 through the interconnector 7, the connection terminal 8 and a metallic felt 19 so that a plurality of cylindrical SOFC elements 40 may be connected in series in the vertical direction. Further, the fuel electrodes 6 of the laterally adjacent cylindrical SOFC elements 40 are connected by a metallic felt 19 so that a plurality of the cylindrical SOFC elements 40 may be connected in parallel in the lateral direction. Current is collected by metallic plates 20.

When the cylindrical SOFC elements are to be operated, the oxidizing gas containing oxygen is flown through cylindrical spaces 13 inside the elements 40, whereas a fuel gas such as hydrogen gas or carbon monoxide is flown in a space 21 among the cylindrical SOFC elements 40 along the outer peripheries of the fuel electrodes 6.

In the SOFC shown in FIG. 2, electric current flows in directions indicated by arrows F from the air electrode to the fuel electrode, and further flows through the filmy air electrode 12 and fuel electrode 6 in directions indicated by arrows D and E, respectively. Therefore, since current flows through a narrow section over a long distance, some of current is converted to and consumed as Joule heat by an ohmic resistance.

SUMMARY OF THE INVENTION

It is therefore an object of the present invention to provide a solid oxide fuel cell (SOFC) which can prevent loss of current due to the ohmic resistance of the fuel electrode and the air electrode, and improve the power generation efficiency.

The present invention relates to the solid oxide fuel cell comprising a plurality of cylindrical solid oxide fuel cell elements arranged, each of said fuel cell elements at least comprising a fuel electrode, a solid electrolyte and an air electrode, and a multi-contact point type current-collecting member contacted to the fuel electrodes, the fuel electrode and the air electrode being electrically connected between the adjacent solid oxide fuel cell elements at least through the multi-contact point type current-collecting member and the interconnector, wherein the multi-contact point type current-collecting member is contacted with the substantially entire surface of the fuel electrode.

The phrase "the multi-contact point type current-collecting member is contacted with the entire surface of the fuel electrode" involves not only a case where the multi-contact point type current-collecting member is completely contacted with the entire surface of the fuel electrode, but also a case where such a slightly poor contact area, which does not cause substantially any adverse effect, remains to some extent.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a front view of a part of an SOFC according to an embodiment of the present invention; and FIG. 2 is a front view of a part of the conventional SOFC.

DETAILED DESCRIPTION OF THE INVENTION

FIG. 1 is a front view of one embodiment of a part of the SOFC of the present invention.

In the SOFC of this embodiment, a double wall structure ceramic pipe 1, which is made of a conductive material and has a closed bottom portion (not shown), is used. The ceramic pipe 1 is of a double wall structure consisting of a bottom-closed air electrode 1a having a bottom and an oxidizing gas feed pipe 1c having open opposite ends. The bottom-closed cylindrical air electrode 1a is integrally connected with the oxidizing gas feed pipe 1c by means of, for example, eight band-like and radially extending ribs 1b. It is preferable that the bottom-closed air electrode 1a, the band-like ribs 1b and the oxidizing gas feed pipe 1c are made of the same air electrode material, and formed integrally by extrusion shaping.

As is the same with the embodiment in FIG. 2, a solid electrolyte 5, a fuel electrode 6, an interconnector 7 and a connection terminal 8 are successively formed around the outer periphery of the ceramic pipe 1, thereby forming an SOFC element 30.

The outer periphery of the fuel electrode 6 is substantially entirely contacted and covered with a nickel felt 9. The nickel felts 9 which cover the fuel electrodes 6 of the laterally adjacent SOFC elements 30 are connected and integrated. In FIG. 1, the nickel felt 9 of the SOFC element 30 is contacted with the connection terminal of the vertically adjacent SOFC element 30, so that the fuel electrode 6 of the SOFC element may be electrically connected to the bottom-closed cylindrical air electrode 1a of the vertically adjacent SOFC element 30 through the connection terminal 8, the interconnector 7 and the nickel felt 9.

Gaps among the nickel felts 9 covering the outer peripheries of the fuel electrodes 6 of the SOFC elements 30 are filled with electrically insulating spacers (filler) 10 having a substantially rhombic section to bury dead spaces.

The ceramic pipe 1 may be made of a ceramic material, such as $LaMnO_3$, $CaMnO_3$, $LaNiO_3$, $LaCoO_3$ or $LaCrO_3$, doped or not doped. Among them, $LaMnO_3$ doped with Sr is preferred. Around the outer periphery of the ceramic pipe 1 is arranged the gas-tight solid electrolyte 5 having pores of about 1 $\mu$m to 100 $\mu$m and composed of zirconia typically stabilized with yttria. When the solid electrolyte 5 is applied to the outer periphery of the air electrode, the air electrode is masked in a selected area in the longitudinal direction, and the interconnector 7 is attached to this selected area. The interconnector 7 must be electrically conductive under an oxygen atmosphere and a fuel atmosphere. The thickness of the interconnector 7 is preferably 5–100 $\mu$m. In the SOFC element 30, that surface portion of the solid electrolyte which is other than the interconnector 7 is surrounded with the fuel electrode 6 functioning as an anode. In general, the fuel electrode 6 is 30–100 $\mu$m in thickness, and made of nickel-zirconia cermet, cobalt-zirconia cermet or the like.

The connection terminal 8 is attached to the upper portion of the interconnector 7. As the material for the connection terminal 8, for example, nickel-zirconia cermet, cobalt-zirconia cermet, nickel and the like may be recited.

During operation, the fuel gas flows along the outer periphery of the fuel electrode 6. On the other hand, the oxidizing gas is first fed into the space 3 inside the oxidizing gas feed pipe 1c, flows inside the the oxidizing gas feed pipe 1c, and reaches the end portion of the SOFC element 30. Then, the oxidizing gas impinges upon the bottom portion of the bottom-closed cylindrical air electrode 1a and turned back there, and the oxidizing gas flows into the oxidizing gas flow paths 4 divided by the band-like ribs 1b and is discharged through an opening of the SOFC element. When the oxidizing gas passes through the oxidizing gas flow paths 4, oxygen in the oxidizing gas generates oxygen ions at the interface between the air electrode 1a and the solid electrolyte 5. The oxygen ions thus generated moves toward the fuel electrode 6 through the solid electrolyte 5, and react with the fuel and simultaneously liberate electrons to the fuel electrode 6.

According to the SOFC of the present invention, the following effects can be obtained.

(1) Since the nickel felt 9 contacts substantially the entire surface of the fuel electrode 6, current is collected in directions orthogonal to the fuel electrode film 6 as shown by arrows A, and flows inside the nickel felt 9 as shown by arrows C. Therefore, the distance through which the current passes inside the fuel electrode 6 having a great specific resistance can be shortened. Thus, since loss of current due to Joule heat is small, the power generating efficiency can be largely improved.

(2) Since the band-like ribs 1b and the oxidizing gas feed pipe 1c are made of the same material as that of the air electrode, current flows along the ribs 1b and the feed pipe 1c as shown by the arrows B, so that the current loss can be further lessened.

(3) Since the nickel felts 9 are pressed to the fuel electrodes 6 by filling the insulating spacers 10 in the gaps among the nickel felts 9, poor contact is not likely to occur between them even when the nickel felts are slightly deformed on use at high temperatures.

(4) Since the SOFC according to the present invention has the structure in which the nickel felt 9 contacts substantially the entire surface of the fuel electrode 6 and the insulating spacer 10 is filled in the gaps so as to uniformly support the brittle SOFC element 30 by small forces over a wide area, occurrence of excessive stresses upon the SOFC element 30 can be prevented to enhance reliability of the entire group of the elements.

(5) Since the oxidizing gas feed pipe 1c is integrally connected with the bottom-provided air electrode 1a by means of the band-like ribs 1b, the oxidizing gas feed pipe 1c can be assuredly located, and variations in performances originating from deviation in relative position between the oxidizing gas feed pipe 1c and the bottom-closed air electrode 1a can be completely diminished. Furthermore, since the ribs 1b radially extend from the oxidizing gas feed pipe 1c, mechanical strength of the SOFC element 30 can be remarkably increased from the standpoint of theory of structure, dynamic.

The above embodiment can be modified in various ways.

Although the nickel felt is used as the multi-contact point type current-collecting member, a current-collecting member such as a needle-like current-collecting member, a comb-like heat resistive metal current-collecting member, a metallic wool-like current collecting member or the like may be used instead of the nickel felt. At that time, it is preferable that the multi-contact point type current-collecting member is made of a heat resistive metal, and has elasticity even at high temperatures of around 1,000° C. In addition, the multi-contact point type current-collecting member may be produced from an electrically conductive material such as an electrically conductive ceramic, a ceramic-covered metal or the like other than the heat resistive metal Furthermore, it is not necessarily indispensable to use the above double wall structure ceramic pipe. It may be that an oxidizing gas feed pipe made of a heat resistive metal is inserted into a space inside a bottom-closed air electrode, and the oxidizing gas is fed into the space inside the cylindrical air electrode through the oxidizing gas feed pipe to generate electricity.

Moreover, the present invention is not limited to the bottom-closed cylindrical SOFC having one end closed, but the invention may be also applied to opposite end-opened SOFC in which cylindrical SOFC elements are accommodated.

According to the solid oxide fuel cell of the present invention, since the multi-contact point type current-collecting member contacts substantially the entire surface of the fuel electrode, current is collected in the directions orthogonal to the fuel electrode, so that current flows inside the multi-contact point type current-collecting member, and further flows into the air electrode of the adjacent solid oxide type fuel cell element at least through the interconnector. Therefore, since the distance through which current flows inside the fuel electrode having great specific resistance can be shortened, loss of current due to Joule heat can be reduced to remarkably improve the power generating efficiency.

What is claimed is:

1. A solid oxide fuel cell comprising a plurality of cylindrical solid oxide fuel cell elements, each of said solid oxide fuel cell elements at least comprising a fuel electrode, a solid electrolyte and an air electrode, and a multi-contact point current-collecting member contacting the fuel electrodes, the fuel electrode of a first solid oxide fuel cell element being electrically connected to the air electrode of an adjacent solid oxide fuel cell element through the multi-contact point current-collecting member and an interconnector, wherein said multi-contact point current-collecting member contacts the entire surfaces of the fuel electrodes.

2. The solid oxide fuel cell according to claim 1, wherein each of the solid oxide fuel cell elements comprises an air electrode pipe, the solid electrolyte and the fuel electrode successively formed around an outer periphery of said air electrode pipe, the interconnector formed on a part of the outer periphery of the solid electrolyte, and a connection terminal formed on the interconnector.

3. The solid oxide fuel cell according to claim 2, wherein the air electrode pipe is a double wall structure pipe consisting of a cylindrical air electrode having a closed bottom end, an oxidizing gas feed pipe having opposite ends opened and located inside said air electrode, and ribs integrally connecting the air electrode and the oxidizing gas feed pipe.

4. The solid oxide fuel cell according to claim 3, wherein said air electrode, said oxidizing gas fed pipe and said ribs are made of an identical material selected from $LaMnO_3$, $CaMnO_3$, $LaNiO_3$, $LaCoO_3$, and $LaCrO_3$, which material is doped or undoped.

5. The solid oxide fuel cell according to claim 1, wherein gaps formed in the multi-contact point current-collecting member are filled with an electrically insulating spacer.

* * * * *